United States Patent
Castillon

[15] 3,665,959
[45] May 30, 1972

[54] PRESSURE REGULATING AND REDUCING GAS-FLOW METER FOR INDUSTRIAL INSTALLATIONS

[72] Inventor: Philippe Charles Albert Castillon, Paris, France
[73] Assignee: Gaz De France, Paris, France
[22] Filed: Mar. 12, 1971
[21] Appl. No.: 123,588

[52] U.S. Cl............................137/551, 73/199, 137/505.22
[51] Int. Cl........................................................F16k 37/00
[58] Field of Search..............137/551, 501, 505.22; 73/199

[56] References Cited

UNITED STATES PATENTS 3,021,684  2/1962  Berck...................................73/199 X Primary Examiner—Henry T. Klinksiek
Attorney—Kenyon & Kenyon Reilly Carr & Chapin

[57] ABSTRACT

Pressure regulating and reducing gas-flow meter device allowing to supply gas at a variable rate of flow and under a predetermined pressure from a source of gas under a higher pressure. The device comprises arranged in series: a pressure reducing and regulating device provided with a pilot circuit, a sonic nozzle mounted downstream of the said regulating device and supplied thereby, and means for measuring the conditions of flow, in the interval comprised between said regulating device and said nozzle, which conditions enable the rate of flow through the apparatus to be measured.

6 Claims, 6 Drawing Figures

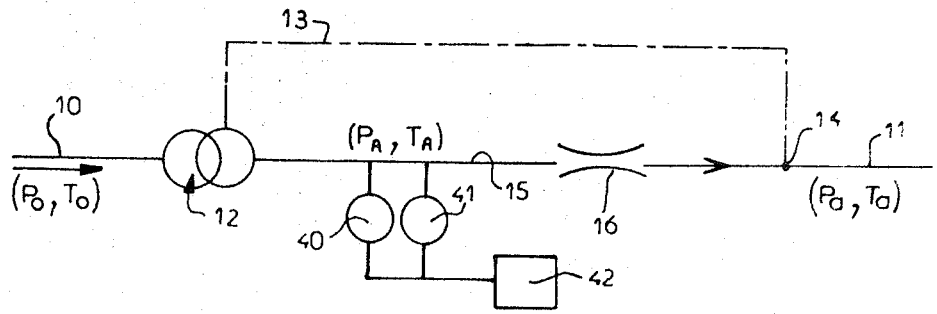
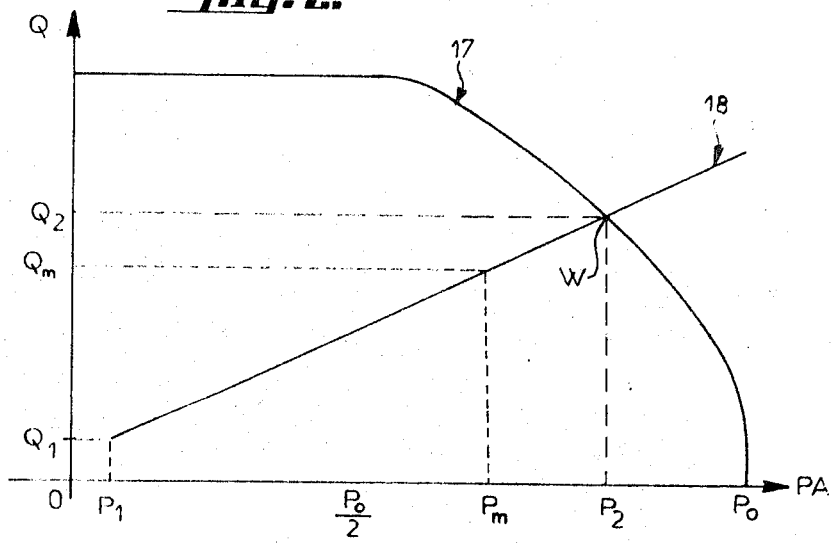
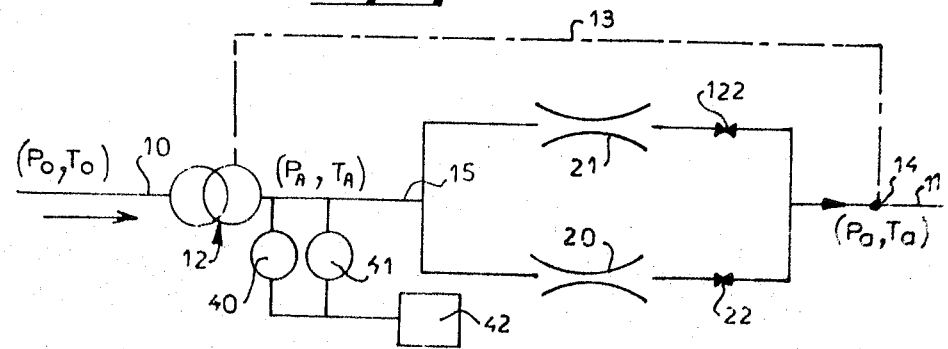

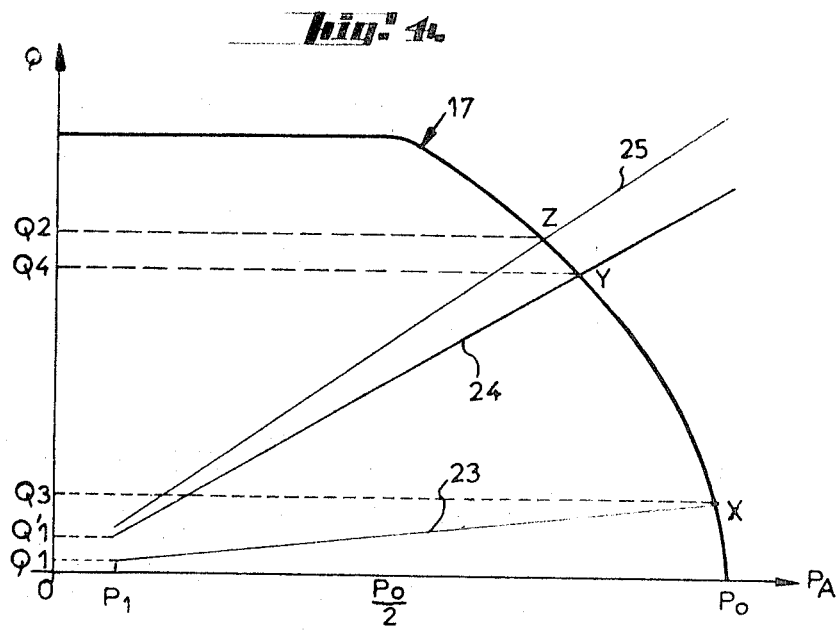
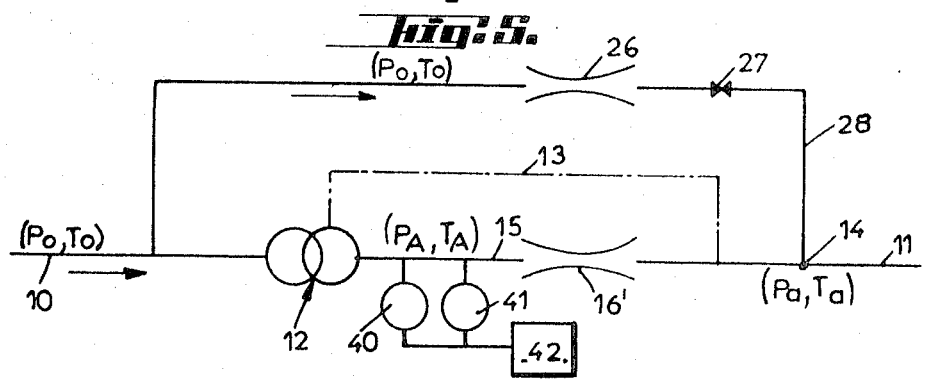
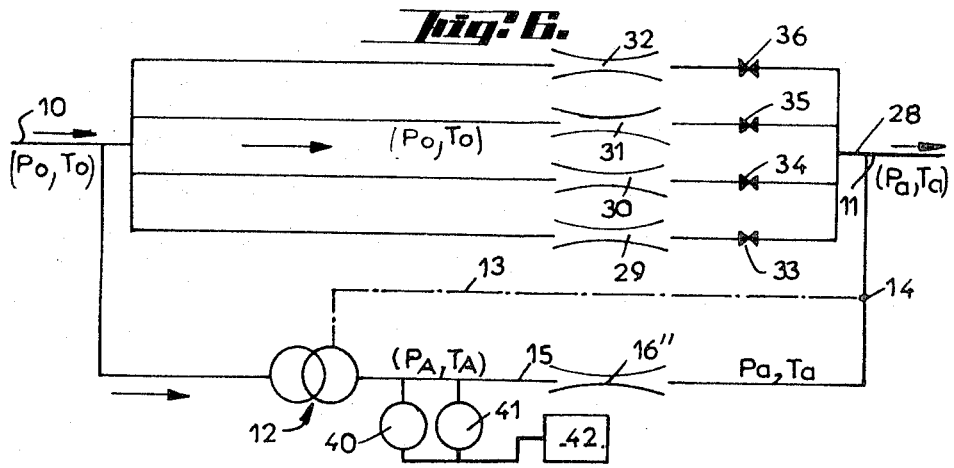

PRESSURE REGULATING AND REDUCING GAS-FLOW METER FOR INDUSTRIAL INSTALLATIONS

The present invention has essentially for its object a pressure regulating and reducing gas-flow meter device allowing to supply gas at a variable rate of flow and under a predetermined pressure adjustable for instance to a substantially constant value, to any industrial installation from a source of gas under a higher pressure, and to simultaneously measure with a high accuracy the amount of gaseous fluid supplied to the said installation. The device according to the invention may be advantageously used for the measurement of very high rates of flow, for instance the rate of flow of a combustible gas supplied at each moment at the start of a network.

In the usual practice, a network constituting a circuit for the supply of user apparatuses is supplied from a source of gas at a higher pressure, owing to an installation comprising a pressure regulating and reducing device which comprises a pilot circuit, the information take-off means of which are located in the circuit supplying the said apparatuses and allows at every moment to keep the pressure in the distribution network substantially constant at a set point or value, irrespective of the flow called for (within a certain range). In such an installation it is extremely difficult, with the known devices, to accurately measure the rates of gas flow supplied to the network. In particular, the known apparatuses used to measure such rates of flow are very sensible to pressure variations and to various disturbances induced in the distribution network. Moreover, such apparatuses are extremely complicated, delicate and expensive.

The pressure distributing and reducing meter device according to the invention does not give rise to such difficulties.

The said meter device is characterized in that it comprises the following members arranged in series: a pressure reducing and regulating device provided with a pilot circuit, at least one sonic nozzle mounted downstream of the said pressure reducing regulating device and supplied thereby, a probe placed downstream of the said nozzle and transmitting to the said pilot circuit the necessary information for the regulation of the said pressure-reducing and regulating device, and means for measuring the conditions of flow, such as the temperature and pressure in the interval comprised between the said reducing and regulating device and the said nozzle, which conditions enable the rate of flow through the apparatus to be measured.

It is indeed known that the rate of discharge of a sonic nozzle depends solely upon the conditions of pressure $P_A$ and temperature $T_A$ existing upstream of the nozzle, and upon the specific gravity $d$ of the gas relative to dry air at 0° C. and at a pressure of 760 millimeters of mercury, or upon the density $\rho_A$ measured under the conditions existing upstream of the nozzle, according to the following theoretical relationships:

$$Q_v = C_1 (P_A / \sqrt{T_A} \sqrt{d})$$

wherein $Q_v$ is the volumetric rate of flow, $$Q_m = C_2 \sqrt{P_A \rho_A}$$

wherein $Q_m$ is the mass rate of flow, $C_1$ and $C_2$ being constant coefficients called discharge coefficients when the gas is a perfect or ideal one. With a real gas, the said coefficients slightly vary according to the upstream conditions, known value tables being available for use.

Where a pressure regulating and reducing gas-flow meter device according to the invention is used, the following advantages are immediately obtained:

the device readily adapts itself to any demand variations, owing to the fact that the reducing device pilot probe placed downstream of the nozzle so controls the progressive opening or closing of the reducing device that the pressure downstream of the nozzle, i.e. the one delivered to the circuit supplying the apparatuses, always remains constant;

the metering accuracy is excellent, for it is sufficient, in order to determine the rate of gas flow, to measure the magnitudes $P_A$, $T_A$ and $d$ if it is desired to determine the volumetric rate of flow, and the magnitude $P_A$ and $\rho_A$ if it is desired to determine the mass rate of flow. In particular, it is no longer necessary, as in the known measuring devices using flow meters under subsonic conditions, to measure the loss of pressure in the nozzle at every moment, a measurement which is known to be very difficult to perform. The measurement is all the more accurate as the sonic throat of the nozzle renders the circuit upstream of the nozzle independent of the downstream circuit, so that the measurement is not liable to be disturbed by pulses possibly induced in the distribution network. Means for damping or preventing disturbing feed-back phenomena at certain resonance frequencies may possibly be provided in the control circuit of the reducing device. The damping of such phenomena may also be obtained, for instance, by selecting for the reducing device a membrane or diaphragm offering sufficient inertia;

the cost of the device is considerably reduced owing to the fact that the meter is reduced, according to the invention, to at least one sonic nozzle and to simple pressure and temperature measuring apparatuses arranged between the reducing device and the nozzle. An integrating device directly converts the measured pressure and temperature values into rate-of-flow values;

the device operates as a flow limiting device preventing a flow higher than a predetermined limit value from being called into the upstream network, the said limit value being adjustable according to the arrangement of the installation as will be explained later;

the reproductibility of the indications of the device is very high, owing to the fact that it comprises no delicate member, thus rendering maintenance operations simpler and less expensive.

Advantageously and according to another feature of the invention, several sonic nozzles are mounted in parallel and provided in their circuits with a cut-off member such as a valve or the like. Such a parallel connection of several nozzles enables the flexibility in use of the measuring device as well as the range of measurable rates of flow to be increased.

The invention will be better understood and other objects, characteristics and advantages thereof will appear as the following description proceeds, with reference to the appended drawings given solely by way of example illustrating several forms of embodiment of the invention and wherein:

FIG. 1 is a diagrammatic view of a pressure regulating and reducing gas-flow meter device designed according to the invention;

FIG. 2 shows diagrams illustrating the operation of the device of FIG. 1;

FIG. 3 is a view similar to that of FIG. 1 relating to a modified form of embodiment of a device according to the invention, comprising two sonic nozzles connected in parallel;

FIG. 4 shows curves illustrating the operation of the device of FIG. 3;

FIGS. 5 and 6 are views similar to those of FIGS. 1 and 3, relating to two other modified forms of embodiment of a device according to the invention.

According to the form of embodiment illustrated in FIGS. 1 and 2, a pressure regulating and reducing flow-meter device according to the invention enables gas to be supplied to a circuit or network 11 for distributing the same to user apparatuses (not shown) from a circuit 10 connected to a source of gas at a higher pressure (not shown), the said device being at the same time adapted to regulate the pressure of the said gas and to meter the rate of flow supplied. Usually, in such distribution networks, the pressure $P_0$ and the temperature $T_0$ of the supply gas are substantially constant, and it is desired to maintain the distribution pressure $P_a$ at the inlet of the network 11 at a substantially constant value.

In order to reduce the pressure of the gas from the value $P_0$ to a lower set value $P_a$ which may be varied according to needs, use is made of a regulating and reducing device 12. In a manner known per se, the latter comprises a pilot circuit 13 which controls the same and the information take-off means 14 of which is placed in the supply circuit 11 of the apparatuses. Thus, if as a result of an increase in demand, the pressure $P_a$ tends to diminish in the network 11, the reducing device 12 controlled by its control circuit 13 opens in order to supply a greater gas flow and restore the pressure $P_a$ to the said set value. Inversely, if the demand diminishes and the pressure $P_a$ tends to increase, the reducing device 12 controlled by its circuit 13 tends to close.

In the complex metering distributing and reducing device according to the invention, a sonic nozzle 16 is mounted in the circuit 15 connecting the reducing device 12 to the circuit 11.

In the circuit 15 between the reducing device 12 and the nozzle 16 are mounted measuring means diagrammatized at 40, 41 for measuring for instance, respectively, the pressure $P_A$ and the temperature $T_A$ in the circuit 15 downstream of the reducing device 12 and upstream of the nozzle 16.

Owing to the sonic character of operation of the nozzle 16, the rate of flow passing therethrough is determined at each moment by the previously mentioned formulas:

$$Q_v = C_1(P_A / \sqrt{T_A} \sqrt{d})$$

as far as the volumetric rate of flow is concerned, $$Q_m = C_2 \sqrt{P_A \rho_A}$$

as far as mass rate of flow is concerned.

Knowing the nature of the gas distributed and, therefore, its specific gravity $d$ (relative to dry air at 0° C. and at 760 millimeters mercury pressure) and also its density $\rho_A$ (under the temperature and pressure conditions prevailing in the circuits 15), the volumetric or the mass rate of gas flow passing through the circuit 15 at every moment may thus be determined immediately in an integrating device 42 according to the measured pressure value $P_A$ and temperature value $T_A$.

The integrating device 42 effects the rate-of-flow measurement irrespective, in particular, of the loss of pressure resulting from the presence of the nozzle 16 in the distribution network.

The two curves illustrated in FIG. 2 show, respectively, the volumetric rate of gas flow Q as a function of the pressure $P_A$, respectively for the reducing device 12 and the nozzle 16. The curve 17 is first composed of a substantially horizontal flat portion until the pressure substantially reaches the value $P_0/2$. At the end of this flat portion, the rate of flow Q diminishes until it is reduced to zero when the pressure $P_A$ reaches the value $P_0$ upstream of the reducing device.

The curve 18 is a straight line extending in prolongation of a parabola arc passing through the point of origin (not shown) and corresponding to the subsonic conditions of flow. As a matter of fact, the nozzle operates under sonic conditions only above a certain minimum rate of flow $Q_1$ corresponding to a pressure $P_1$. It is desirable to reduce $Q_1$ and, therefore, $P_1$ to a minimum, and this is readily obtained by using a nozzle having a sufficiently long diffuser cone of 7°. In this case, $P_1$ may come down to a value equal to 1.05 $P_a$. The point W of intersection of the curves 17 and 18 shows the maximum rate of flow $Q_2$ which may pass through the reducing device and the nozzle mounted in series, the rate of flow $Q_2$ corresponding to a maximum pressure $P_A$ equal to $P_2$.

The installation therefore operates correctly at all rates of flow $Q_m$ comprised between $Q_1$ and $Q_2$. The rate of flow $Q_m$ is determined by the value $P_m$ of the pressure $P_A$ existing in the circuit 15. The nozzle 16 acts as a means limiting and determining the flow passing through the device. In addition, it ensures a certain reduction of the gas flow which complements the reducing action of the reducer 12. In addition, under sonic working conditions, the pressure $P_A$ and temperature $T_A$ conditions upstream thereof vary as a function of the rate of flow passing therethrough, and this rate of flow can be calculated directly and in a simple manner by simply measuring the said conditions.

According to the modified form of embodiment illustrated in FIGS. 3 and 4, wherein the similar parts of both installations are indicated in the same manner, the single nozzle 16 of FIG. 1 is replaced by two nozzles 20, 21 mounted in parallel in the circuit 15 proceeding from the reducing device 12. The nozzles 20, 21 open into the distribution circuit or network 11 through the medium of closing members such as the valves 22, 122 controlling the nozzle 20 and 21, respectively.

FIG. 4, in the same manner as FIG. 2, shows the curve 17 characterizing the operation of the reducing device 12, a curve 23 characterizing the operation of the nozzle 20, a curve 24 characterizing the operation of the nozzle 21 and the curve 25 corresponding to the sum of the flows of curves 23 and 24.

At low rates of flow, the valve 122 is closed and only the sonic nozzle 20 is operated. The rates of flow may then be stepped between a minimum value $Q_1$ corresponding to the minimum threshold of operation of the nozzle 20 and a maximum value $Q_3$ corresponding to the point X of intersection of the curves 17 and 24 as explained in connection with FIG. 2. At values higher than $Q_3$ and lower than $Q_4$ corresponding to the ordinate of the point Y of intersection of the curves 17 and 24, the valve 22 is closed and the valve 122 is opened, so that the gas flow passes only through the nozzle 21. It should be noted in FIG. 4 that the curve 24 characterizing the nozzle 21 is so selected that the minimum rate of flow $Q'_1$ corresponding to its threshold of operation is considerably lower than the rate of flow $Q_3$, so that the nozzle 21 operates under sonic conditions immediately after switching. In addition, in order to avoid having to pass too frequently from one nozzle to the other in the range of flow rates close to $Q_3$, it is necessary that the nozzle 21 may operate under sonic conditions at flow rates considerably lower than $Q_3$. The extent of the switching range may be adjusted by means of the valves 22, 122. Unstable operation phenomena such as pumping phenomena in the installation are thus avoided.

At flow rates higher than $Q_4$, both valves 22, 122 are opened, the maximum flow $Q_2$ which can pass through the installation corresponding to the ordinate of the point Z of intersection of the curves 17 and 25. All the operations of opening and closing of the valves 22 and 122 are advantageously controlled automatically, according to the flows admitted, by the variations of the pressure $P_a$.

The measurement of the rate of flow passing through the installation is performed, as in FIG. 1, starting from the apparatuses 40, 41 for measuring the values $P_A$ and $T_A$ and the integration of these values in the integrating device 42.

In the modified form of embodiment illustrated in FIG. 5, it is seen that to an installation whose structure is identical with that of FIG. 1, is adjoined an additional sonic nozzle 26 connecting the supply source circuit 10 to the distribution network circuit 11. Otherwise stated, the additional sonic nozzle 26 is mounted in parallel on the regulating and reducing meter (comprising the regulating and reducing device 12, the nozzle 16', the control means 13 and the measuring devices 40, 41, 42) connecting the source of gas at a pressure $P_0$ directly to the supply circuit at a pressure $P_a$. A valve 27 placed in the circuit 28 of the nozzle 26 enables the latter to be cut-off.

Since the nozzle 26 is a sonic nozzle and the supply conditions (pressure $P_0$ and temperature $T_0$) of the supply source are constant, a constant gas flow is admitted through the circuit 28 (the said constant flow depending only upon the conditions upstream of the nozzle, i.e. the pressure $P_0$ and the temperature $T_0$ of the gas).

By selecting for this flow a value substantially equal to the maximum flow $Q_2$ which may pass through the nozzle 16', the distributing and metering capacity of the installation may, as a first approximation, be doubled.

Indeed, at rates comprised between $Q_1$ and $Q_2$ (FIG. 2) the valve 27 is closed, the circuit 11 being supplied only by the nozzle 16'.

At values higher than $Q_2$, the valve 27 is open and a constant flow $Q_5$ is admitted in parallel with the flow of the nozzle 16'.

The measurement of the flow rate according to the measured values of the variables $P_A$ and $T_A$ and the regulation of the flow as it passes through the nozzle 16' and the reducing device 12 are performed as described previously. To the variable flow determined by the integrating device 42 is added the constant flow $Q_5$ passing through the nozzle 26.

According to the modified form of embodiment illustrated in FIG. 6, the sonic nozzle 26 of FIG. 5 is replaced by a set of sonic nozzles 29 to 32, each of which may be cut off or put into operation by a control valve 33 to 36.

The nozzles 29 to 32 are each used individually like the nozzle 26. Advantageously, their flow rates are stepped and the control of the valves 33 to 36 is performed automatically and may be made to depend upon a minimum value and maximum value of pressure $P_A$.

In practice, in order, on the one hand, to avoid unsteady operation phenomena and, on the other hand, to operate the nozzles 16' (FIG. 5) or 16'' (FIG. 6) alternately at low and high flowrates (close to $Q_1$ and $Q_2$, respectively as shown in FIG. 2), the nozzles 16', 16'' in an installation of the type illustrated in FIGS. 5 and 6 are advantageously replaced by a pair of associated nozzles as shown in FIG. 3. The sequence of operation of these various nozzles is then suitably selected. The flow rates of the nozzles 26 (FIG. 5) and 29 to 32 (FIG. 6) should also be so selected that every time one of them is switched the sonic nozzles mounted in the circuit 15 operate within a range comprised between their minimum flow rate and their maximum flow rate.

It should be noted that owing to the interposition in the distribution network, upstream of the user apparatuses, of one or several nozzles in parallel arrangement, all the devices described above offer the advantage of ensuring an automatic limitation of the flow, which can never exceed the sum of the maximum flows passing through the various nozzles under the supply conditions $P_0$, $T_0$ of the installation. The flow called for in the downstream network may thus be limited at any moment irrespective of the conditions existing in the latter.

What is claimed is:

1. Pressure regulating and reducing meter device for the supply of a gas fluid at a variable rate of flow and a substantially constant pressure, in particular for an industrial installation, from a source of gas at a higher pressure, comprising arranged in series: a pressure regulating and reducing device provided with a pilot circuit, at least one sonic nozzle mounted downstream of the said regulating and reducing device and supplied by the latter, a probe placed downstream of the said nozzles and transmitting to the said pilot circuit the information for the regulation of the said regulating and reducing device, and means for measuring the conditions of flow, such as the temperature and pressure in the interval comprised between the said regulating and reducing device and the said nozzle, the said conditions being supplied to measuring means for enabling the flow passing through the apparatus to be measured.

2. Device according to claim 1, wherein the said probe supplies to the pilot circuit the measured value of the pressure existing downstream of the nozzle and the said regulating and reducing device is so controlled by the said measured value as to keep the said pressure equal to the set value at the point of measurement.

3. Device according to claim 1, comprising several said sonic nozzles mounted in parallel and provided in their circuit with a cut-off valve member.

4. Device according to claim 3, wherein the dimensions of the nozzles are stepped.

5. Metering, distributing and pressure-reducing device for the supply of a gas fluid at a variable rate of flow and a predetermined pressure from a source of gas at a higher pressure comprising in addition to a pressure regulating and reducing meter device as described in claim 1, at least one additional sonic nozzle mounted in parallel with the said pressure regulating and reducing meter device, the said auxiliary nozzle connecting the source of gas under pressure directly to the supply circuit of the industrial installation, a cut-off valve member being mounted in series with the said auxiliary nozzle.

6. Device according to claim 5, comprising several said additional nozzles, the dimensions of which are stepped, mounted in parallel, each said additional nozzle being provided with an associated cut-off device.

* * * * *